US012160817B2

(12) United States Patent
Khalid

(10) Patent No.: US 12,160,817 B2
(45) Date of Patent: Dec. 3, 2024

(54) CONTENT DISTRIBUTION IN A MULTI-NETWORK ENVIRONMENT

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 358 days.

(21) Appl. No.: 17/585,998

(22) Filed: Jan. 27, 2022

(65) Prior Publication Data

US 2023/0254764 A1 Aug. 10, 2023

(51) Int. Cl.
| | |
|---|---|
| *H04W 48/18* | (2009.01) |
| *H04W 24/04* | (2009.01) |
| *H04W 24/08* | (2009.01) |
| *H04W 40/24* | (2009.01) |
| *H04W 48/16* | (2009.01) |
| H04W 88/04 | (2009.01) |

(52) U.S. Cl.
CPC ........... *H04W 48/18* (2013.01); *H04W 24/04* (2013.01); *H04W 24/08* (2013.01); *H04W 40/24* (2013.01); *H04W 48/16* (2013.01); H04W 88/04 (2013.01)

(58) Field of Classification Search
CPC ..... H04W 48/18; H04W 24/04; H04W 24/08; H04W 40/24; H04W 48/16; H04W 88/04; H04W 84/047
See application file for complete search history.

(56) References Cited

U.S. PATENT DOCUMENTS

| | | | | |
|---|---|---|---|---|
| 9,024,894 B1* | 5/2015 | Smith | ................... | G06F 3/0488 345/173 |
| 9,042,346 B2* | 5/2015 | Kim | .................. | H04W 36/0009 370/315 |
| 2009/0323659 A1* | 12/2009 | Zhang | ................... | H04W 76/14 370/338 |
| 2012/0176927 A1* | 7/2012 | Takano | .............. | H04B 7/15507 370/252 |
| 2013/0176935 A1* | 7/2013 | Kim | ...................... | H04W 88/04 370/315 |

* cited by examiner

*Primary Examiner* — Michael A Keller
(74) *Attorney, Agent, or Firm* — Armis IP Law, LLC

(57) ABSTRACT

A wireless network environment includes communication management hardware such as disposed in customer premises equipment. The communication management hardware detects a request communication from a mobile communication device, the request communication transmitted from the mobile communication device to a wireless base station. In response to detecting the request communication, the customer premises equipment monitors for reply communication from the wireless base station. The communication management hardware detects failure of the wireless base station to respond to the request communication. In response to detecting the failure, the communication management hardware operates in a relay mode to provide the mobile communication device connectivity with the wireless base station.

35 Claims, 11 Drawing Sheets

CONTENT DISTRIBUTION IN A MULTI-NETWORK ENVIRONMENT

BACKGROUND

Conventional wireless systems support different types of wireless connectivity. For example, conventional wireless systems support so-called fixed wireless access (FWA) connectivity between a wireless base station and so-called customer premises equipment. Fixed wireless access is a cost effective option to provide broadband wireless services in rural areas requiring minimal equipment and effort to install compared to alternative implementations including hardwired networks (such as coaxial cable, optical fiber, etc.).

BRIEF DESCRIPTION OF EMBODIMENTS

Embodiments herein provide improved implementation of wireless access networks and expand use of limited wireless bandwidth in a network environment.

More specifically, a wireless network environment includes customer premises equipment (such as including communication management hardware). The customer premises equipment residing in the wireless network environment detects a request communication from a mobile communication device. The request communication (such as channel access request) is transmitted from the mobile communication device to a wireless base station. In response to detecting the request communication, the customer premises equipment (a.k.a., a wireless station) monitors for a reply communication from the wireless base station. The customer premises equipment detects failure of the wireless base station to respond to the request communication. In response to detecting the failure of the wireless base station to respond to the request communication, the customer premises equipment operates the customer premises equipment in a relay mode to provide the mobile communication device connectivity with the wireless base station. Thus, the customer premises equipment operates in a relay mode, ensuring that the wireless base station receives communications transmitted by the customer premises equipment.

In further example embodiments, the customer premises equipment receives a notification from the wireless base station indicating to monitor one or more wireless channels (such as a first wireless channel, second wireless channel, etc.) providing wireless connectivity between the wireless base station and the mobile communication device. In such an instance, the customer premises equipment detects the request communication via monitoring of the first wireless channel; and detects the failure of the wireless base station to respond to the request communication via monitoring of a second wireless channel. Additionally, or alternatively, the customer premises equipment monitors a same channel for the mobile communication device request and the wireless base station response.

In response to detecting the failure of the wireless base station to respond to the request communication, the customer premises equipment transmits a message to the wireless base station indicating the detected initial request communication transmitted from the mobile communication device. In one embodiment, the customer premises equipment populates the message to indicate an identity of the mobile communication device transmitting the request communication to the wireless base station.

Still further example embodiments herein include, via the customer premises equipment (a.k.a., communication management resource, wireless access point, etc.), establishing a first wireless communication link between the customer premises equipment and the mobile communication device; and establishing a second wireless communication link between the customer premises equipment and the wireless base station. The second wireless communication link may be pre-existing. The customer premises equipment receives first communications from the mobile communication device over the first wireless communication link and then transmits the first communications from the customer premises equipment over the second wireless communication link to the wireless base station. The customer premises equipment receives second communications from the wireless base station over the second wireless communication link and then transmits the second communications over the first wireless communication link to the mobile communication device.

In one nonlimiting example embodiment, the first wireless communication link supports first time-division duplex communications over the first wireless communication link; the second wireless communication link supports second time-division duplex communications synchronized with the first time-division duplex communications.

Further, in one embodiment, the customer premises equipment schedules or synchronizes communications between the mobile communication device and the wireless base station to continue a dropped wireless connection between the mobile communication device and the wireless base station. Thus, even though the mobile communication device is unable to directly communicate with the wireless base station, the mobile communication device is able to communicate through the customer premises equipment to the wireless base station. In a reverse direction, if needed or desired, the wireless base station is able to communicate through the customer premises equipment to the mobile communication device. Alternatively, the wireless base station transmits at a sufficiently high power level to wirelessly communicate with the mobile communication device in the downlink.

In still further example embodiments, the customer premises equipment is a fixed wireless base station providing user equipment in a subscriber domain access to a remote network over first wireless connectivity between the customer premises equipment and the wireless base station. The customer premises equipment provides the outlier mobile communication device access to the remote network through the customer premises equipment even though the mobile communication device is disposed outside the subscriber domain.

Further example embodiments herein include, via the customer premises equipment, receiving allocation of wireless channels from a spectrum access system. The allocated wireless channels support connectivity between the customer premises equipment and the mobile communication device. In one embodiment, the customer premises equipment communicates heartbeat messages from the customer premises equipment to the spectrum access system to receive continued rights (via grants) to use the allocated wireless channels.

Yet further embodiments herein include, via the customer premises equipment, in response to detecting the failure of the wireless base station to respond to the request communication, transmitting a message to the wireless base station indicating an identity of the mobile communication device and receiving allocation of one or more wireless channels to support connectivity between the customer premises equipment and the mobile communication device.

Embodiments herein are useful over conventional techniques. For example, as previously discussed, mobile communication devices that are otherwise out of range with respect to a main wireless base station (such as customer premises equipment) are able to continue to communicate with the main wireless base station through the customer premises equipment (in a relay mode). The customer premises equipment (such as at a fixed location providing wireless services to a subscriber domain) provides support for mobile communication devices out of range with respect to a main wireless base station.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: detect a request communication from a mobile communication device, the request communication transmitted from the mobile communication device to a wireless base station; in response to detecting the request communication, monitor for reply communication from the wireless base station; and in response to detecting failure of the wireless base station to respond to the request communication, operate the customer premises equipment in a relay mode to provide the mobile communication device connectivity with the wireless base station.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
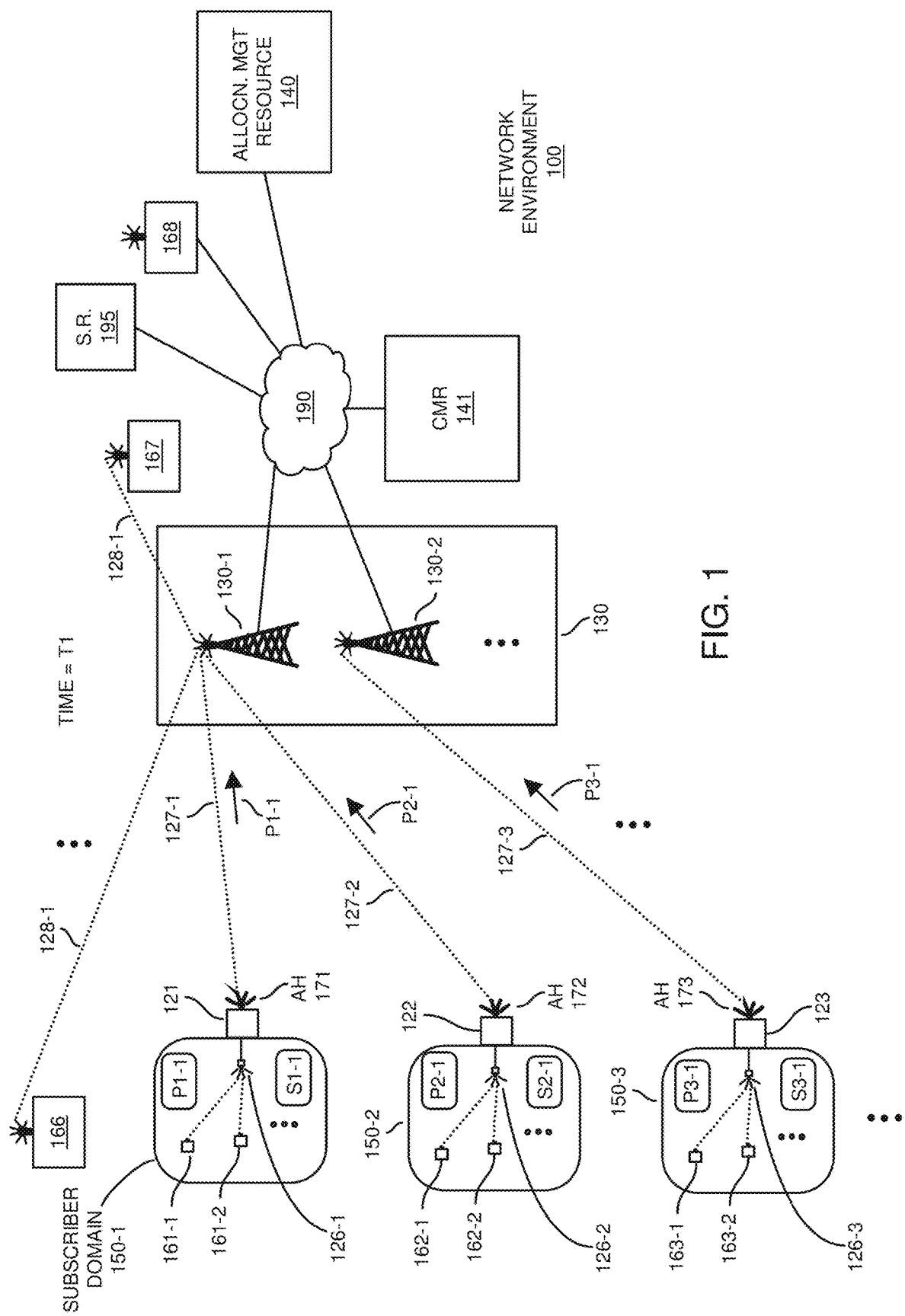
FIG. 1 is an example diagram illustrating collection and distribution of performance data associated with wireless connectivity in a wireless network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

A wireless network environment includes communication management hardware such as disposed in customer premises equipment. The communication management hardware (such as implemented via communication management hardware, communication management software, or combination of communication manager hardware and communication management software) detects a request communication from a mobile communication device; the request communication is transmitted from the mobile communication device to a wireless base station. In response to detecting the request communication, the customer premises equipment monitors for reply communication from the wireless base station. The communication management hardware detects failure of the wireless base station to respond to the request communication. In response to detecting the failure, the communication management hardware operates in a relay mode to provide the mobile communication device connectivity with the wireless base station.

As further discussed herein, a wireless access point is registered as a base-station with a SAS and determines if it can support the UEs and how many UEs it can support. An performance server such as an Iperf server determines how much additional UEs and corresponding bandwidth could be supported and what services can be supported and allocated to the out of range mobile communication device. This is to ensure that the CPE customer's services will not be interrupted. The information will be reported back to the EPC and EPC will make the call on admittance of the UEs.

As previously discussed, the wireless access point (a.k.a., customer premises equipment) first listens passively to find UEs near by, this is possible by listening to the UEs transmitting on PRACH channel.

These UEs are reported back to the communication management resource. The communication management resource performs a compare function to determine if the UEs are already on the network or have been dropped due to poor quality or were never on the network.

After determining that the UEs do need to be on the network, the EPC will commence the process of registering the CPE as a relay (base-station) with SAS and instruct CPE to be the base-station towards those UEs.

The EPC, after receiving permission from the SPECTRUM ACCESS SYSTEM, provides configuration information to the CPE relay i.e., what transmission power to transmit, how to admit UEs into the system etc.

The CPE will need a wireless form of communication to carry out this communication. Since the UEs are out of the reach of the main network, the CPE will have to do some communications work on its own. This work is based on the configurations shared by the network through donor enodeB.

Note that the communication between UEs and CPEs could be carried over LTE D2D. D2D communication can be in network or out of network, in case of an out of network or out of range mobile communication device (i.e., when the UEs are out of the reach of the main network), the D2D communication is out of network and the CPE provides key parameters to the UEs to enable the communication.

Now, with reference to the drawings, FIG. 1 is an example diagram illustrating wireless connectivity as well as collection and distribution of performance data associated with wireless connectivity in a wireless network environment according to embodiments herein.

In this example embodiment, the network environment 100 includes multiple subscriber domains 150 (such as subscriber domain 150-1, subscriber domain 150-2, subscriber domain 150-3, etc.), wireless network 130 (including one or more wireless base station 130-1, wireless base station 130-2, etc.), communication management resource 140, and control management resource 141.

Each of the subscriber domains 150 includes wireless equipment providing one or more mobile communication devices wireless access to a remote network 190.

For example, wireless access point 121 (a.k.a., customer premises equipment, wireless station, etc.) in subscriber domain 150-1 includes antenna hardware 126-1 and antenna hardware 171. Via the antenna hardware 171, the wireless access point 121 is in communication with the wireless base station 130-1 over wireless link 127-1 and provides wireless connectivity (such as via any suitable wireless communication protocol including WiFi™, LTE or Long Term Evolution, etc.) to mobile communication devices 161-1, 161-2, etc. For example, the wireless access point 121 in subscriber domain 150-1 includes antenna hardware 126-1 to communicate with each of the mobile communication devices 161 (e.g., mobile communication device 161-1, mobile communication device 161-2, etc.). Wireless access point 121 (such as customer premises equipment including communication manager hardware, communication management software, or a combination of communication manager hardware and communication management software) includes communication processing hardware and software and provides a communication pathway between antenna hardware 126-1 and antenna hardware 171. Antenna hardware 171 supports connectivity of the wireless access point 121 over wireless communication link 127-1 to the wireless base station 130-1. Thus, via a respective wireless communication link with the antenna hardware 126-1, each of the mobile communication devices 161 are in communication with the wireless access point 121 and through the wireless communication link 127-1 and the wireless base station 130-1 to remote network 190.

Wireless access point 122 (a.k.a., customer premises equipment, wireless station, etc.) in subscriber domain 150-2 includes antenna hardware 126-2 and antenna hardware 172. Via the antenna hardware 172, the wireless access point 122 is in communication with the wireless base station 130-1 over wireless link 127-2 and provides wireless connectivity (such as via any suitable wireless communication protocol including WiFi®, LTE or Long Term Evolution, etc.) to mobile communication devices 162-1, 162-2, etc. For example, the wireless access point 122 in subscriber domain 150-2 includes antenna hardware 126-2 to communicate with each of the mobile communication devices 162 (e.g., mobile communication device 162-1, mobile communication device 162-2, etc.). Wireless access point 122 includes communication processing hardware and software and provides a communication pathway between antenna hardware 126-2 and antenna hardware 172. Antenna hardware 172 supports connectivity over wireless communication link 127-2 to the wireless base station 130-1. Thus, via a respective wireless communication link with the antenna hardware 126-2, each of the mobile communication devices 162 is in communication with the wireless access point 122 and through the wireless communication link 127-2 and the wireless base station 130-1 to remote network 190.

Wireless access point 123 (a.k.a., customer premises equipment, wireless station, etc.) in subscriber domain 150-3 includes antenna hardware 126-3 and antenna hardware 173. Via the antenna hardware 173, the wireless access point 123 is in communication with the wireless base station 130-2 over wireless link 127-3 and provides wireless connectivity (such as via any suitable wireless communication protocol including WiFi®, LTE or Long Term Evolution, etc.) to mobile communication devices 163-1, 163-2, etc. For example, the wireless access point 123 in subscriber domain 150-3 includes antenna hardware 126-3 to communicate with each of the mobile communication devices 163 (e.g., mobile communication device 163-1, mobile communication device 163-2, etc.). Wireless access point 123 includes communication processing hardware and software and provides a communication pathway between antenna hardware 126-3 and antenna hardware 173. Antenna hardware 173 supports connectivity over wireless communication link 127-3 to the wireless base station 130-2. Thus, via a respective wireless communication link with the antenna hardware 126-3, each of the mobile communication devices 163 is in communication with the wireless access point 121 and through the wireless communication link 127-3 and the wireless base station 130-2 to remote network 190.

In one nonlimiting example embodiment, one or more of the wireless stations 121, 122, 123, etc., is disposed at a respective fixed location in a subscriber domain. In such an instance, the wireless station 121 (such as fixed wireless access customer premises equipment) is a first fixed wireless station supporting first fixed wireless access to the mobile communication devices 161 (a.k.a., user equipment) in subscriber domain 150-1; the wireless station 122 is a second fixed wireless station (such as fixed wireless access customer premises equipment) supporting second fixed wireless access to the mobile communication devices 162 (such as user equipment) in subscriber domain 150-2; the wireless station 123 is a third fixed wireless station supporting third fixed wireless access to the mobile communication devices 163 (such as user equipment) in subscriber domain 150-3; and so on.

As previously discussed, each wireless station (such as customer premises equipment) provides connectivity (such as fixed wireless access connectivity) of the subscriber domain and corresponding equipment such as mobile communication devices to wireless network 130.

Assume that the mobile communication device 161-1 generates a request to retrieve respective content such as a webpage from server resource 195 (or other destination) or connect (such as establish a phone call connection) with mobile communication device 168. To this end, in an upstream (uplink) direction, mobile communication device 161-1 operated by a respective user transmits communications (such as a content or other type of request) over a respective wireless communication link in subscriber domain 150-1 to the wireless access point 126-1; the wireless station 121 processes and transmits the communications received from the mobile communication device 161-1 over the wireless communication link 127-1 to the wireless base station 130-1; wireless base station 130-1 transmits the communications (such as a request for content) over network 190 to the server resource 195 or mobile communication device 168 (destination address identified by the request).

In a downstream direction, in response to receiving a request for content, the server resource 195 (or other entity in network 190) communicates the requested content (such as a web page or other suitable digital asset) for acceptance of a respective phone call over network 190 to the wireless base station 130-1; wireless base station 130-1 transmits the requested content or call response over wireless communication link 127-1 to antenna hardware 171 of the wireless station 121; via antenna hardware 126-1, the wireless station 121 wirelessly transmits the requested content or call response to the mobile communication device 161-1.

In a similar manner, the mobile communication device 161-2 communicates data (such as content request or other data) in upstream direction to the server resource 195; server resource 195 communicates data (such as requested content or other information) in a downstream direction to the mobile communication device 161-2.

In accordance with further example embodiments, note that the respective wireless stations or other suitable resources generate performance information associated with each of the subscriber domains and corresponding wireless stations and wireless communication links. This enables the communication management resource 141 to determine which of the wireless access points are available for supporting supplemental connectivity with mobile communication devices in the network environment 100.

For example, wireless station 121 can be configured to implement settings S1-1 (such as generated and distributed by the control management resource 141 or other suitable entity) to communicate over wireless communication link 127-1. In one embodiment, based on transmission and reception of wireless communications over wireless communication link 127-1, the wireless station 121 or other suitable monitor resource (such as in wireless base station 130-1) generates performance information P1-1 indicating a performance or the respective wireless communication link 127-1. In one embodiment, the performance information P1-1 indicates information such as an amount of wireless bandwidth and/or latency associated with communications conveyed over the wireless communication link 127-1 to support wireless communications between the wireless base station 130-1 and the wireless station 121. Note that, in one embodiment, the wireless base station 130-1 and corresponding service provider may be required to provide a certain service level of bandwidth (such as above a bandwidth threshold level) and latency (such as below a latency threshold level) to the wireless access point 121 and corresponding mobile communication devices 161. Additionally, or alternatively, the performance information P1-1 can be configured to indicate whether the service provided to the subscriber domain 150-1 and corresponding one or more mobile communication devices 161 is above or below respective service levels. Thus, the performance information is useful to determine if the wireless station 121 or wireless base station 130-1 has any extra available wireless bandwidth to support communications with other mobile communication devices such as mobile communication device 166, mobile communication device 167, and so on.

Wireless station 122 can be configured to implement settings S2-1 (such as generated and distributed by the communication management resource 141 or other suitable entity) to communicate over wireless communication link 127-2. In one embodiment, based on transmission and reception of wireless communications over wireless communication link 127-2, the wireless station 121 or other suitable monitor resource (such as in wireless base station 130-1) generates performance information P2-1 indicating a performance of the respective wireless communication link 127-2. In one embodiment, the performance information indicates information such as an amount of wireless bandwidth and/or latency associated with communications conveyed over the wireless communication link 127-2 to support wireless communications between the wireless base station 130-1 and the wireless station 122. Note that, in one embodiment, the wireless base station 130-1 and corresponding service provider may be required to provide a certain service level of bandwidth (such as above a bandwidth threshold level) and latency (such as below a latency threshold level) to the wireless access point 122 and corresponding mobile communication devices 162. Additionally, or alternatively, the performance information P2-1 can be configured to indicate whether the service provided to the subscriber domain 150-2 and corresponding one or more mobile communication devices 162 is above or below respective service levels. Thus, the performance information is useful to determine if the wireless station 122 or wireless base station 130-1 has any extra available wireless bandwidth to support communications with other mobile communication devices such as mobile communication device 166, mobile communication device 167, and so on.

Thus, the first wireless station 121 and the wireless network 130 collectively establish a first wireless link 127-1 between the first wireless station 121 and the wireless base station 130-1. The second wireless station 122 and the wireless network 130 collectively establish a second wireless link 127-2 between the second wireless station 122 and the wireless base station 130-2. The third wireless station 123 and the wireless network 130 collectively establish a third wireless link 127-3 between the third wireless station 123 and the wireless base station 130-2.

In further example embodiments, the wireless stations 121, 122, etc., (such as fixed wireless access stations or instances of customer premises equipment) and/or wireless base station 130 communicate the performance information P1-1, P2-1, P3-1, etc., to the control management resource 141 or other suitable entity in the network.

As further discussed herein, note again that wireless service level provided to each of the wireless access points 121, 122, 123, etc., can be continuously monitored to determine if it is possible to operate a respective wireless access point in a relay mode to support communications with one or more mobile communication devices 166, 167, etc., outside of the respective subscriber domain. For example, as further discussed herein, the wireless access point 121 can be configured to provide wireless connectivity to mobile communication device 166 if sufficient wireless resources are available to do so. If the wireless connectivity provided to the mobile communication device 166 causes the performance associated with supporting wireless communications to the wireless access point 121 to fall below a respective threshold level, or latency associated with transmitted data packs above a respective latency threshold, the control management resource 141 can be configured to discontinue operating the wireless access point 121 in a relay mode.

As shown in FIG. 1, at time T0, in a manner as previously discussed, the wireless base station 130-1 provides each of the subscriber domains 150-1 and 150-2 connectivity to the remote network 190 via respective wireless communication link 127-1 and wireless communication link 127-2. Additionally, the wireless base station 130-1 supports wireless connectivity 128-1 with the mobile communication device 166. The wireless connectivity 128-1 provides the mobile communication device 166 access to remote network 190 (such as the Internet, mobile phone network, etc.) and corresponding resources (such as server 195, mobile communication device 168, etc.) connected to it. The wireless base station 130-1 supports wireless connectivity 128-2 with the mobile communication device 167. The wireless connectivity 128-2 provides the mobile communication device 166 access to remote network 190 (such as the Internet, mobile phone network, etc.) and corresponding resources (such as server 195, mobile communication device 168, etc.) connected to it.

Note that the ability of the mobile communication device 166 to communicate with the wireless base station 130-1 may vary depending upon the location of the mobile communication device 166. For example, the wireless base station 130-1 may be disposed at a fixed location. At time T2, the mobile communication device 166 may have moved further away from the wireless base station 130-1 such that the wireless messages (i.e., signals) from the mobile communication device 166 no longer reach the wireless base station 130-1. As further discussed below, in such an instance, embodiments herein include operating the wireless access point 121 (such as customer premises equipment, wireless station, etc.) in a so-called relay mode in which the wireless access point 121 supports connectivity of the mobile communication device 166 to the wireless base station 131.

In still further example embodiments, the wireless base station 130-1 monitors the location of any mobile communication devices that are at the edge of the respective network, indicating that they are susceptible to losing connectivity with the wireless base station 130-1. The wireless base station 130-1 uses the received performance information as a basis to determine which if any of the instances of the wireless access point 121, 122, 123, etc., are available to support supplemental wireless conductivity of on a range mobile communication devices.

In one embodiment, if the wireless base station 131-1 determines that a respective mobile communication device 166 is on the edge of the network and is potentially about to lose connectivity with the wireless base station 130-1, the wireless base station 130-1 communicates a respective command to the wireless access point 121. The command notifies the wireless access point 121 to operate in a scan mode to monitor for and detect communications from one or more mobile communication devices outside of the subscriber domain 150-1. During the scan mode, the wireless access point 121 listens for any mobile communication devices transmitting access request messages (such as PRACH request or random access channel request messages) over a RACH (Random Access Channel) to the wireless base station 130-1. As previously discussed, the request messages may not be received by the wireless base station 130-1.

Thus, the multiple mobile communication devices in the wireless network environment may be transmitting access request messages in the network environment. In one embodiment, the wireless base station 130-1 notifies the wireless access point 121 which if any of the different devices (such as based on one or more frequencies, unique identity associated with a mobile communication device group as specified by the wireless base station 130-1 or other suitable entity) to listen to and provide corresponding feedback to the wireless base station 130-1 and/or communication management resource 141.

Figure 2:
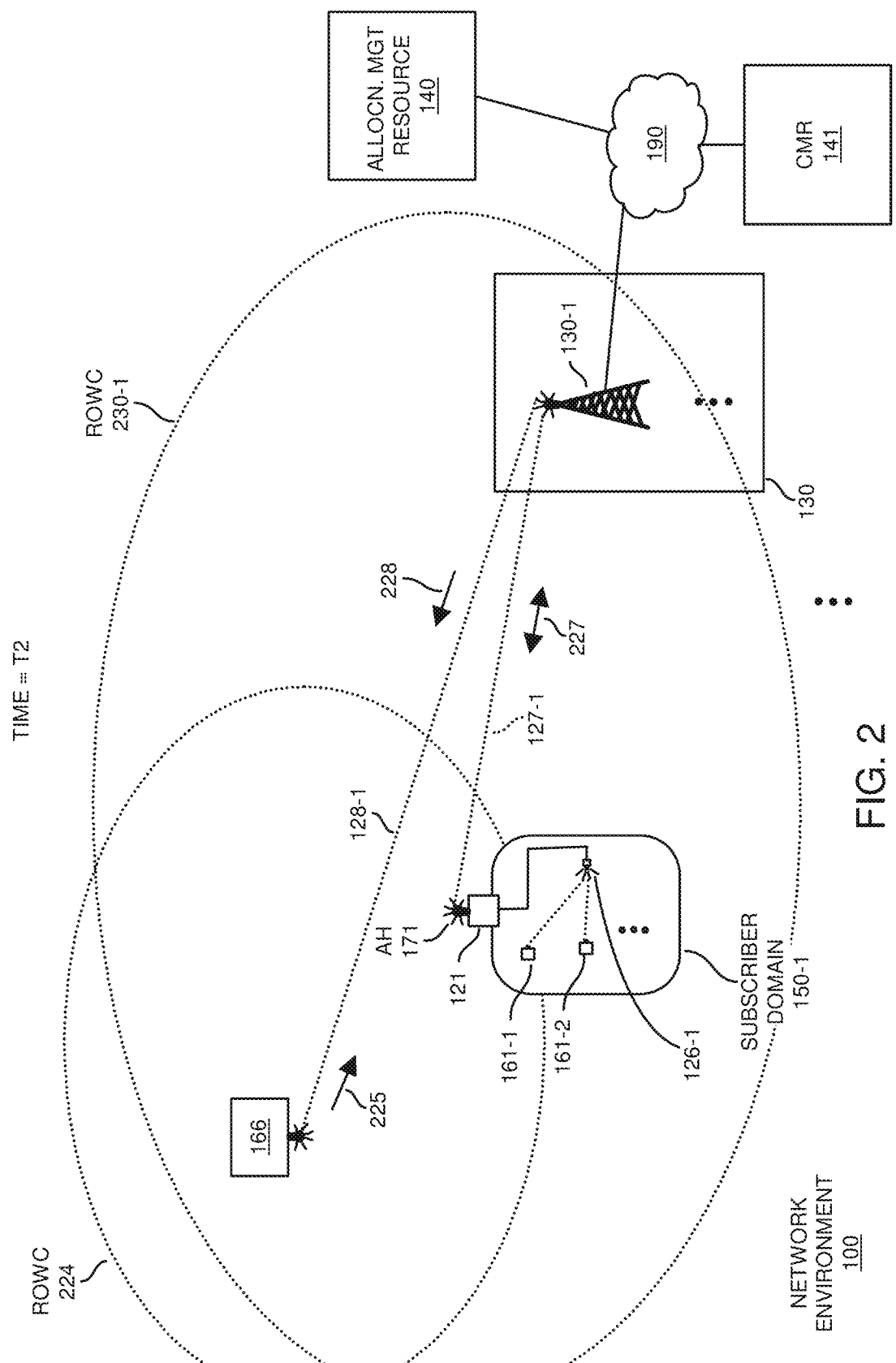
FIG. 2 is an example diagram illustrating the inability of a mobile communication device to communicate with a respective wireless base station and monitoring by customer premises equipment according to embodiments herein.

FIG. 2 is an example diagram illustrating the inability of a mobile communication device to communicate with a respective wireless base station and monitoring by customer premises equipment according to embodiments herein.

In a general embodiment, the wireless access point 121 (such as customer premises equipment) resides in the wireless network environment 100 and detects a request communication (such as communications 225) communicated from the mobile communication device 166. The request communication is transmitted from the mobile communication device 166 to the wireless base station 130-1.

In one embodiment, the communications 225 include a request for scheduling of bandwidth (grant of wireless channels resources) to communicate in the uplink direction from the mobile communication device 166 over the communication link 128-1 to the wireless base station 131. Ideally, the wireless base station 130-1 would receive the communications 225 transmitted from the mobile communication device 166. However, in this example, at time T2, the mobile communication device 166 has a wireless transmit range as indicated by the region of wireless coverage 224. Thus, the wireless base station 130-1 does not receive the wireless communications 225.

In response to detecting the request and corresponding communications 225 processed at the wireless access point 121, the wireless access point 121 monitors wireless resources for corresponding reply communications (such as a wireless channel grant or acknowledgment that the wireless base station 130-1 received the request in communications 225) from the wireless base station 130-1. After monitoring for a predetermined time duration, assume that the wireless access point 121 detects failure of the wireless base station 130-1 to respond to the request communications 225. This most likely means that the wireless transmission power level associated with transmitting wireless communications 225 is not sufficient the high enough for the wireless base station 130-1 to receive wireless communications 225 and that the wireless base station 130-1 is out of range with respect to the mobile communication device 166 at least in the uplink direction.

In one embodiment, in response to detecting the failure of the wireless base station 130-1 to respond to the request communications 225 within a time duration threshold level, the wireless access point 121 operates in a relay mode because it assumes that the mobile communication device 166 is out of range with respect to the wireless base station 130-1. As discussed herein, the wireless access point 121 operates in a so-called relay mode to provide the mobile communication device 166 connectivity with the wireless base station 130-1. In one embodiment, operation of the wireless access point 121 in the relay mode includes forwarding of the communications 225 over the wireless communication link 127-1 to the wireless base station 130-1. Operation of the wireless access point 121 in the relay mode ensures that the wireless base station 130-1 receives communications 225 transmitted by the mobile communication device 166 or the wireless base station 130-1 is at least notified that the mobile communication device 166 transmitted communications 225 to it.

Embodiments herein are useful over conventional techniques. For example, as previously discussed, the mobile communication device 166 may be able to communicate with the wireless base station 130-1 via wireless communication link 128-1 at time T1. When out of range at time T2, the wireless access point 121 supports uplink communications such that the mobile communication device 166 is able to continue to communicate with the main wireless base station 130-1 through the wireless access point 121 (customer premises equipment). Thus, the wireless access point 121 (such as at a fixed location provides wireless services to a subscriber domain) provides support for the mobile communication device 166 out of range with respect to wireless base station 130-1 at time T2.

In further example embodiments, note that the wireless access point 121 (a.k.a., customer premises equipment, communication management hardware, etc.) can be configured to receive a notification from the wireless base station 130-1 (or other suitable entity) indicating to monitor one or more wireless channels (such as a first wireless channel, second wireless channel, etc.) providing wireless connectivity between the wireless base station 130-1 and the mobile communication device 166 in response to the wireless base station 130-1 detecting that the mobile communication device 166 is moving out of range with respect to the wireless base station 130-1. For example, the wireless base station 130-1 can be configured to monitor a location of the mobile communication device 166 and notify the wireless access point 121 to monitor communications from the mobile communication device 166 on one or more wireless channels used by the wireless base station and the mobile communication device 166 to communicate with each other when the mobile communication device is located on the edge of the network. In such an instance, the wireless access point 121 monitors those channels (such as such as a first wireless channel, second wireless channel, etc.) detects the request communication in communications 225 via monitoring of, for example, a first wireless channel; the wireless access point 121 can be configured to monitor a second wireless channel for response communication from the wireless base station 130-1. The wireless access point 121 can be configured to detect the failure of the wireless base station 130-1 to respond to the request communication in communications 225 via monitoring of the second wireless channel.

In a similar manner as previously discussed, in response to detecting the failure of the wireless base station 130-1 to respond to the communications 225 transmitted by the mobile communication device 166, the wireless access point 121 transmits a message (such as via communications 227) over wireless communication link 127-1 to the wireless base station 130-1. In one embodiment, the message indicates the detected request communications associated with communications 225 transmitted from the mobile communication device 166. In one embodiment, the wireless access point 121 generates the message communicated over the wireless communication link 127-1 to the wireless base station 130-1 to include information pertinent in the communications 225 received from the mobile communication device 166.

For example, in one embodiment, the wireless access point 121 populates the message to indicate an identity (such as network address, unique identifier value, etc.) of the mobile communication device 166 transmitting the request communication to the wireless base station 130-1. In such an instance, the wireless base station 130-1 is informed that the communications 225 conveyed from the wireless access point 121 to the wireless base station 131 are transmitted by the mobile communication device 166.

As further shown in the following FIG. 3, the wireless access point 121 can be configured to establish wireless connectivity with the mobile communication device 166 in response to detecting that the mobile communication device 166 is unable to communicate with the wireless base station 130-1.

Figure 3:
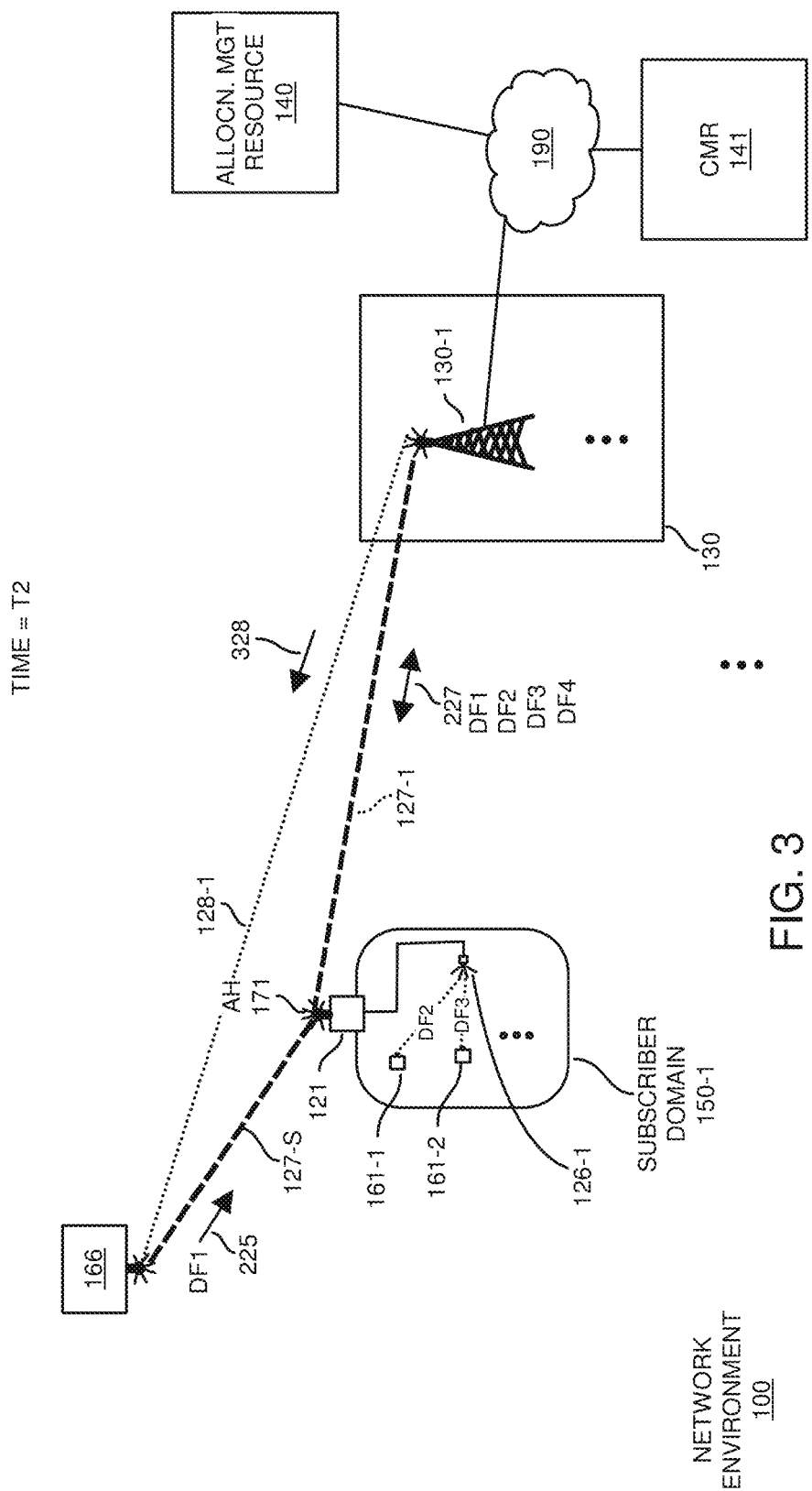
FIG. 3 is an example diagram illustrating operation of customer premises equipment in a relay mode according to embodiments herein.

FIG. 3 is an example diagram illustrating operation of customer premises equipment in a relay mode according to embodiments herein.

As previously discussed, the wireless access point 121 can be configured to operate in a respective relay mode based on a respective one or more communications such as commands received from the communication management resource 141.

In one embodiment, in response to receiving a command to operate in the relay mode, the wireless access point 121 establishes a first wireless communication link 127-S between the wireless access point 121 and the mobile communication device 166. The wireless access point 121 also establishes or uses bandwidth of an existing second wireless communication link 127-2 between the wireless access point 121 and the wireless base station 130-1 to support wireless connectivity (via transmission of data packets) from the mobile communication device 166 and/or data packets associated with the mobile communication devices 161-1, 161-2, etc.

As further shown in this example embodiment, the wireless access point 121 receives first communications in dataflow DF1 from the mobile communication device 166 over the first wireless communication link 127-S and then transmits the first communications associated with dataflow DF1 from the wireless access point 121 over the second wireless communication link 127-2 to the wireless base station 130-1. In one embodiment, the wireless access point 121 tags the communications with a unique identifier value tag to indicate that they (or corresponding data) are received from the mobile communication device 166. If desired, in one embodiment, the wireless access point 121 can be configured to receive second communications (directed to the mobile communication device 166) from the wireless base station 130-1 over the second wireless communication link 127-1 and then transmits the received second communications over the wireless communication link 127-S to the mobile communication device.

Additionally or alternatively, note that the wireless base station 130-1 can be configured to transmit at a sufficiently high wireless power level to communicate directly with the mobile communication device over the wireless communication link 128-1. In such an instance, the wireless base station 130-1 may not communicate any downlink communications over wireless communication link 127-1 to the wireless access point 121 as the wireless base station 130-1 communicates the data directly to the mobile communication device 166.

Note further that the mobile communication device 166 may rely on use of control plane connectivity and data plane connectivity with the wireless base station 130-1 in order to communicate through the wireless access point 121 or directly with the wireless base station 130-1.

In further example embodiments, note that the wireless communication link 128-1 can be configured to support control plane communications (such as the wireless base station 130-1 notifying the mobile communication device 166 of a wireless transmit direction, channels, power levels, etc., at which to communicate wireless signals to the wireless access point 121) and/or downlink communications from the wireless base station 130-1 to the mobile communication device 166. In a manner as previously discussed, the supplemental wireless communication link 127-S and relay operation of the wireless access point 121 supports uplink communications (such as data associated with the data plane) from the mobile communication device 166 to the wireless base station 130-1.

Note further that the wireless system as described herein can be configured to support time division duplex communications. For example, one or more wireless channels can be split into first time slots supporting downlink communications and second time slot supporting uplink communications. The wireless stations are assigned use of those different time slots to support conveyance of respective information and/or data. In one embodiment, the wireless communication link 127-S supports first time-division duplex communications; the wireless communication link 127-1 second time-division duplex communications. Via appropriate scheduling management at the wireless access point 121, the second time division duplex communications are synchronized with the first time-division duplex communications. In one embodiment, the timeslot in which communications received from the mobile communication device 166 align with timeslots of the wireless access point 121 communicating those communications over wireless communication link 127-1.

Thus, in one embodiment, the wireless access point 121 can be configured to schedule communications between the mobile communication device 166 and the wireless base station 130-1 to continue an otherwise dropped wireless connection between the mobile communication device 166 and the wireless base station 130-1. Thus, even though the mobile communication device 166 is unable to directly communicate with the wireless base station 130-1 because it's wireless transmit power level is too low (such as to save power), the mobile communication device 166 is able to communicate through the wireless access point 121 to the wireless base station 130-1 over the shared data flows supported by the wireless communication link 127-1. As previously discussed, in a reverse direction, if needed, the wireless base station 130-1 is able to communicate respective downlink data flows through the wireless access point 121 to the mobile communication device 166.

Thus, the wireless access point 121 (such as customer premises equipment or first wireless access point) provides mobile communication devices 161-1, 161-2, etc., (user equipment) in subscriber domain 150-1 access to a remote network 190 over first wireless connectivity (wireless communication link 127-1) between the wireless access point 127-1 and the wireless base station 130-1. Via communication links 127-S and 127-1, as long as the mobile communication devices 161 receive a wireless service above a threshold level, the wireless access point 121 provides the mobile communication device 166 access to the remote network 190 through the wireless access point 121 even though the mobile communication device 166 is disposed outside the subscriber domain 150-1.

In still further example embodiments, the wireless access point 121 communicates over communication link 127-1 and through wireless base station 130-1 to receive allocation of wireless channels from the allocation management resource 140. Further example embodiments herein include, via the wireless access point 121, receiving allocation of wireless channels from the allocation management resource 140. The allocated wireless channels support connectivity (such as wireless communication link 127-S) between the wireless access point 121 and the mobile communication device 166.

Subsequent to receiving approval (allocation) to use respective one or more wireless channels to support communications in the network environment 100, in one embodiment, the wireless access point 121 receives and/or transmits heartbeat messages associated with use of the allocated wireless channels from the wireless access point 121 to the allocation management resource 140 (such as a spectrum access system) to receive continued rights (via grants) to use the allocated wireless channels. Without the continued grants, the wireless access point 121 must discontinue use of the allocated wireless channels.

In one embodiment, the allocated wireless channels are channels allocated from a CBRS (Citizens Band Radio System) spectrum, although the wireless channels can be allocated from any suitable band Note further that embodiments herein include, in response to the wireless access point 121 detecting the failure of the wireless base station 130-1 to respond to the request communication, transmitting a message from the wireless access point 121 to the wireless base station 130-1 (the message indicates an identity of the mobile communication device 166) and receiving allocation of one or more wireless channels to support connectivity between the wireless access point 121 and the mobile communication device 166.

Figure 4:
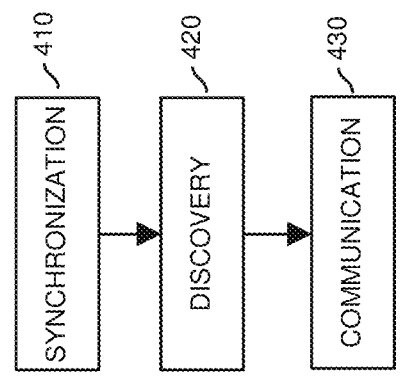
FIG. 4 is an example diagram illustrating a process flow associated with operating customer premises equipment in a relay mode according to embodiments herein.

FIG. 4 is an example diagram illustrating a process flow associated with operating customer premises equipment in a relay mode according to embodiments herein.

In processing operation 410, LTE D2D synchronization is achieved over sidelink PSSS (Primary Side link Synchronization Signal) and SSSS (Secondary Side link Synchronization Signal).

In processing operation 420, the system supports Type 2B: UE specific semi-persistent resource allocation.

In processing operation 430, the system supports Mode 1: Network allocates resources for communication.

Figure 5:
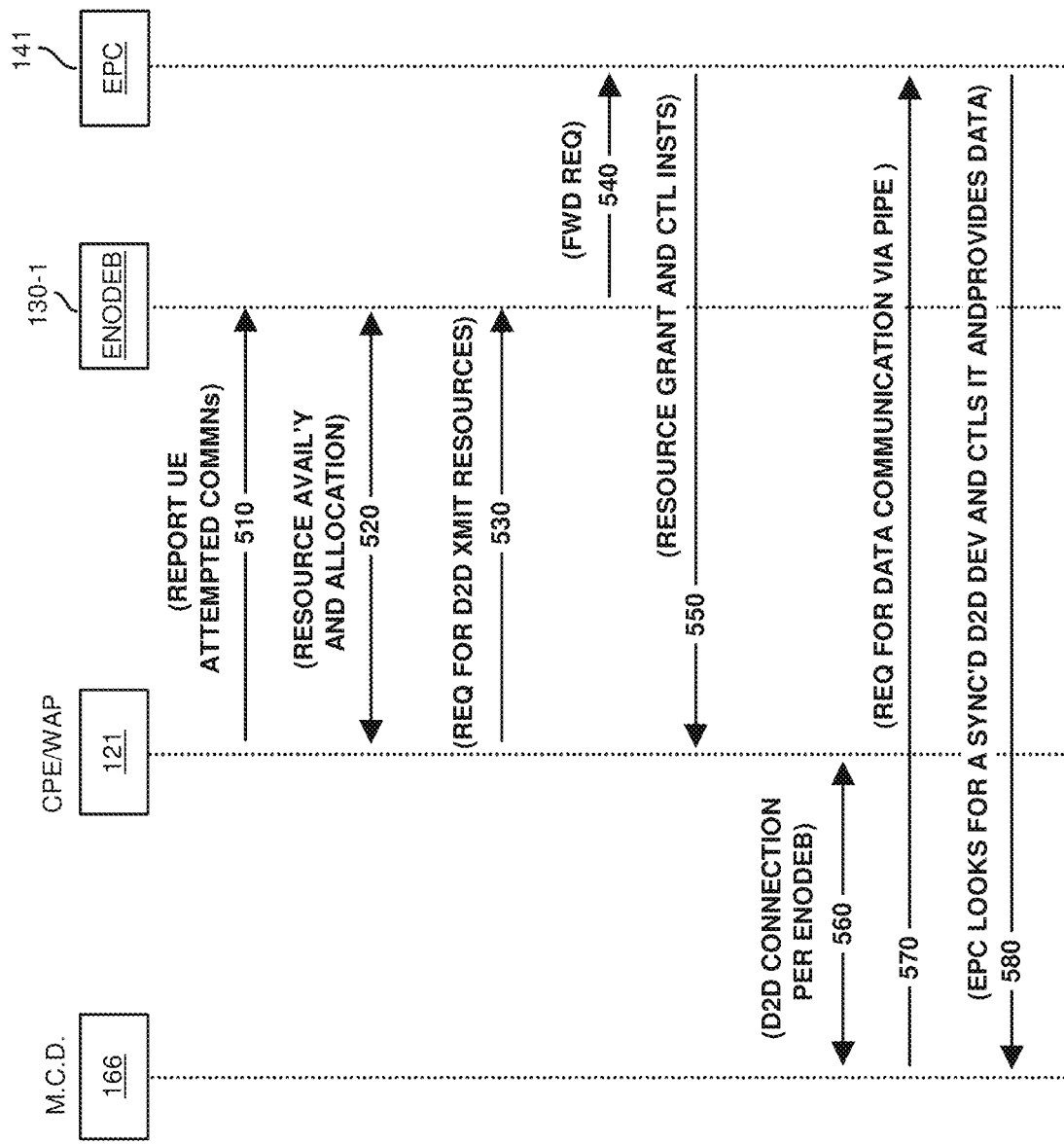
FIG. 5 is an example diagram illustrating communication flow amongst multiple entities in a wireless network to support connectivity through a customer premises equipment operating in a relay mode according to embodiments herein.

FIG. 5 is an example diagram illustrating communication flow amongst multiple entities in a wireless network to support connectivity through a customer premises equipment operating in a relay mode according to embodiments herein.

As previously discussed, the wireless access point 121 detects one or more conditions in which the mobile communication device 166 attempts to communicate with the wireless base station 130-1 and in which the wireless base station 130-1 does not respond. Via communications 510, the wireless access point 121 reports one or more instances of the mobile communication device 166 attempting to communicate with the wireless base station 131 for instances in which the wireless base station 131 does not respond.

In response to receiving communications 510, via communications 520, the wireless base station 130-1 communicates availability and allocation of wireless resources for use by the wireless access point 121 to establish connectivity with the mobile communication device 166.

Via communications 530 from the wireless access point 121 to the wireless base station 130-1, the wireless access point 121 requests wireless link resources (such as D2D or other suitable wireless communication protocol) to support communications in accordance with a particular wireless communication protocol.

Via communications 540, the wireless base station 130-1 forwards the respective detected one or more channel access requests request for wireless resources to the communication management resource 141.

In response to receiving the request for resources, the communication management resource 141 transmits communications 550 to the wireless access point 121. The communications 550 include resource grant information (such as one or more wireless channels) as well as control instructions associated with supporting communications between the wireless access point 121 and the mobile communication device 166.

Via communications 560, the mobile communication device 166 and wireless access point 121 establish a respective wireless communication link 127-S.

Via communications 570 transmitted over the wireless communication link 127-S and the communication link 127-1, the mobile communication device 166 transmits a respective request for a pipe (such as a secured tunnel or other suitable data flow) between the mobile communication device 166 and the wireless base station 130-1 or other entity in wireless network environment 100. Subsequent to establishing a respective tunnel or dataflow, the mobile communication device 166 communicates over the dataflow (such as data for DF1) to the wireless base station 130-1.

Figure 6:
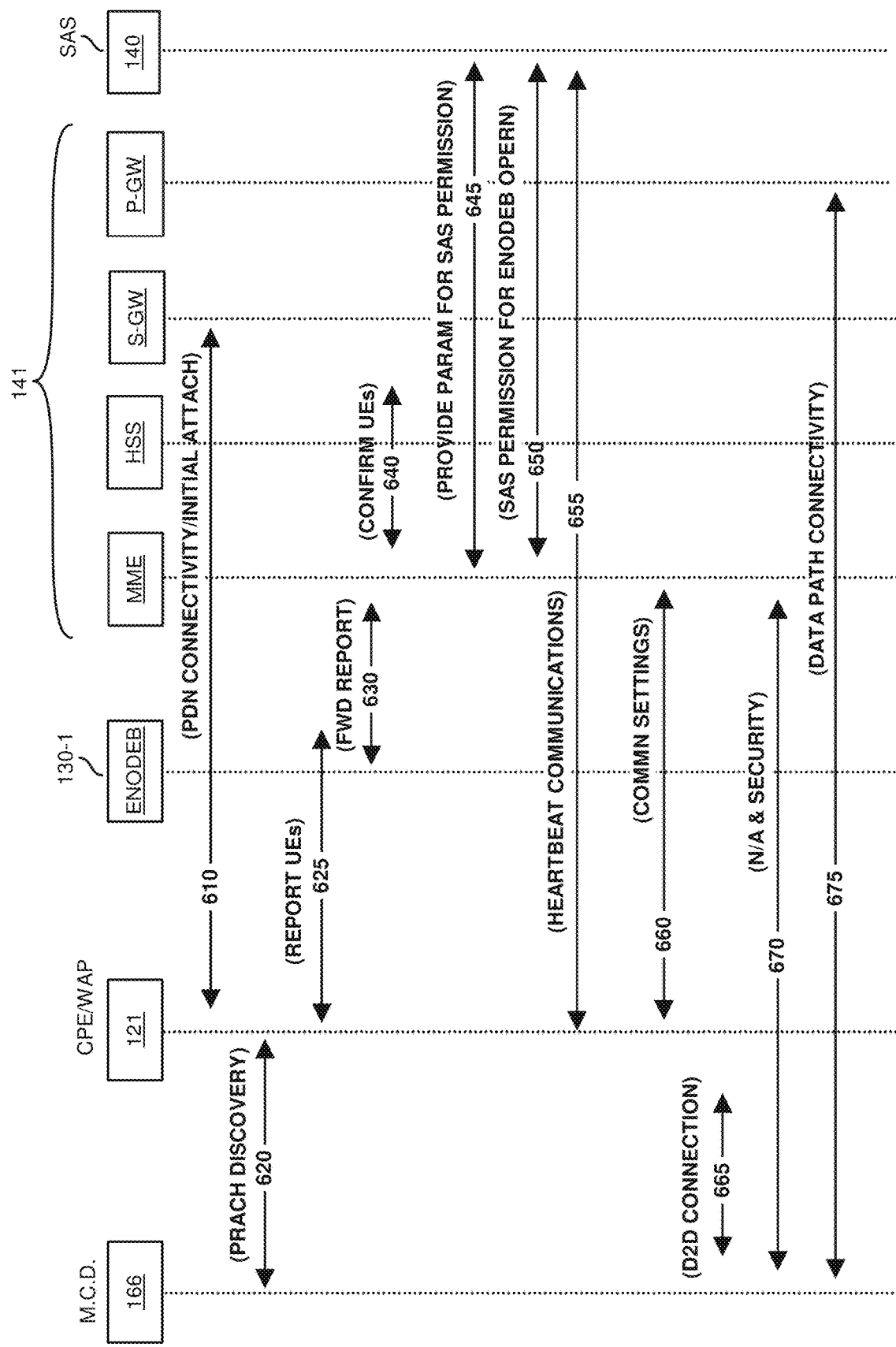
FIG. 6 is an example diagram illustrating communication flow amongst multiple entities in a wireless network to support connectivity through a customer premises equipment operating in a relay mode according to embodiments herein.

FIG. 6 is an example diagram illustrating communication flow amongst multiple entities in a wireless network to support connectivity through a customer premises equipment operating in a relay mode according to embodiments herein.

Via communications 610, the wireless access point 121 establishes connectivity with a gateway (a.k.a., P-GW) of the communication management resource 141. The gateway provides connectivity to a respective network such as the Internet, cellular network, etc.

Further, as previously discussed, via monitoring of communications 620, the wireless access point 121 monitors for any requests or other communications transmitted by any of the mobile communication devices of interest in the wireless network environment 100. The wireless access point 121 also monitors for appropriate wireless responses from the wireless base station 130-1.

Via communications 625, the wireless access point 121 reports identities of any of the one or more mobile communication devices that transmit a respective access request but that do not receive a response from the wireless base station 130-1. In further example embodiments, the wireless access point 121 notifies the wireless base station 130-1 or other suitable entity which channel (frequency) was used by the mobile communication device 166 to transmit the access request message or other messages.

Via communications 630, the wireless base station 130-1 forwards a respective report to the MME associated with the communication management resource 141. In one embodiment, the report indicates identities of the one or more mobile communication devices in the wireless network that are out of range with respect to the wireless base station 130-1 and whose communications are not received by the wireless base station 130-1.

Via communications 640, the MME communicates with the HSS to determine whether the respective identified mobile communication devices are supported by the wireless base station 130-1. The MME confirms that the one or more mobile communication devices such as including mobile communication device 166 is part of the network supported by the wireless base station 130-1.

Via communications 645, the MME provides appropriate parameters/settings for the wireless access point 121 to use one or more wireless channels.

Via communications 650, the allocation management resource 140 provides notification of permission for the wireless access point 121 to use one or more wireless channels to establish connectivity with the mobile communication device 166. The MME or other suitable entity notifies the wireless access point 121 of the one or more channels that are available for supporting wireless connectivity 127-S with the mobile communication device 166. In one embodiment, as previously discussed, the wireless communication link 127-S supports D2D or other suitable type of communications.

Via communications 655, the wireless access point 121 repeatedly communicates a heartbeat request to the allocation management resource 140. The allocation management resource (such as spectrum access system) repeatedly responds with grant communications indicating that the wireless access point 121 is able to continue use of the previously allocated wireless channels.

Via communications 660, the MME notifies the wireless access point 121 that it is able to operate in the relay mode to support connectivity with one or more mobile communication devices that are unable to communicate with or that are out of range with respect to the wireless base station 130-1. In one embodiment the transmitted communication settings include information (such as wireless power transmit levels, wireless signal directivity, power step up control, etc.) controlling operation of the wireless access point 121 to communicate in the wireless network environment 100.

Subsequent to receiving the communication settings from the MME, the wireless access point 121 establishes wireless connectivity 127-S between the wireless access point 121 and the mobile communication device 166.

Via communications 670 between the mobile communication device 166 and the MME, the mobile communication device 166 receives a respective assigned network address and security information in order to set up a corresponding data path between the mobile communication device and the Gateway.

Via communication 675, the mobile communication device 166 communicates uplink data through the wireless access point 121 and wireless base station 130-1 to the Gateway. In one embodiment, the Gateway forwards the uplink communications to the appropriate destination in the remote network 190. In a reverse direction, the Gateway receives communications from one or more entities in the network 190 and forwards them in the downlink direction through the wireless base station 130-1 and the wireless access point 121 to the mobile communication device 166.

Figure 7:
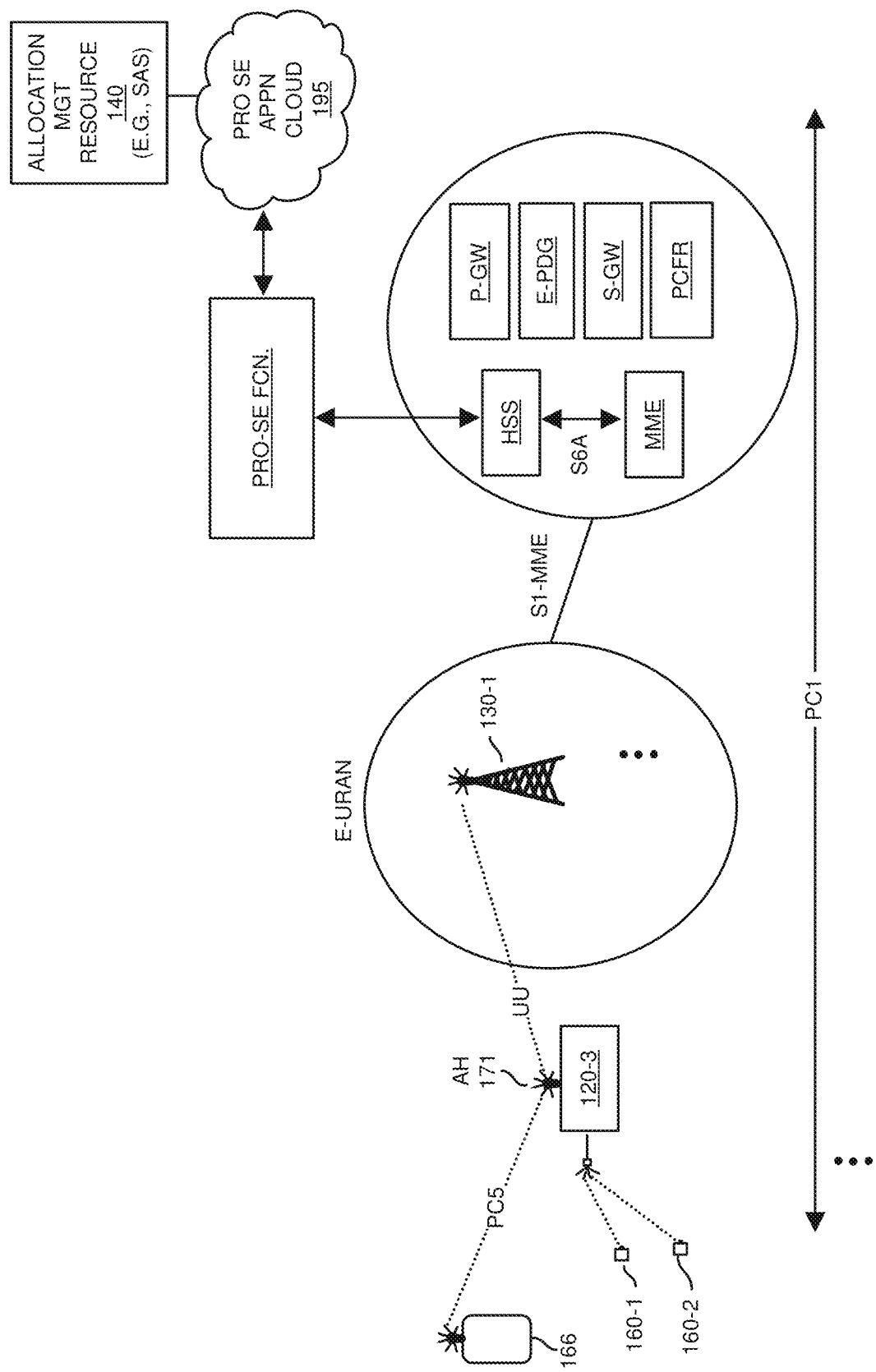
FIG. 7 is an example diagram of a network environment and implementation of customer premises equipment in a relay mode according to embodiments herein.

FIG. 7 is an example diagram of a network environment and implementation of customer premises equipment in a relay mode according to embodiments herein.

As previously discussed, any mobile communication device or UEs that are out of range with respect to the wireless base station 130-1 will communicate normally and will be detected by in-coverage wireless access point 121.

In one embodiment, the wireless access point 121 implements or relies on use of a performance monitor such as an Iperf agent to measure performance information such as including KPIs (Key Performance Indicators) indicating good or bad communication conditions. The wireless access point 121 reports the performance information (such as KPIs) to a communication management resource 141 (such as an EPCc or Evolved Packet Core). The communication management resource can be configured to determine what resources to allocate to the wireless access point and how much resources each of the out of coverage UEs (such as mobile communication device 166, mobile communication device 167, etc.) could have from a certain CPE. (such as wireless access point 121). In one embodiment, as previously discussed, the communication management resource determines whether to allow the wireless access point 121 to operate in the so-called relay mode.

In further example embodiments, the CPEs (wireless access point 121, wireless access point 122, etc.) can be configured to register as an eNodeB with a Channel allocation management resource 141 such as a spectrum access system. As previously discussed, the allocation management resource allocates the wireless access point 121 one or more wireless channels in which to communicate with the mobile communication device 166. Further, in a manner as previously discussed, in accordance with commands from the communication management resource 141 or other suitable entity, the wireless access point 121 relays the data traffic from the mobile communication devices over wireless communication links 127-S and 127-1 to the wireless base station 130-1.

Subsequent to receiving permission from a respective spectrum access system to use one or more wireless channels, the wireless access point 121 uses the granted wireless channels to support transmission and exchange of communications between the wireless access point 121 and the one or more out of range mobile communication devices.

In one embodiment, the process of providing relay communication is dynamic and dependent on wireless channel grants from the respective spectrum access system. Note that the spectrum access system can be configured to deallocate use of respective wireless channels if such resources aren't needed anymore to support relay mode communications via respective wireless communication link 127-S (such as a D2D connection). The communication management resource can be configured to maintain a table of records indicating connections, channel conditions, SLAs, etc., associated with each wireless access point instance (such as between the wireless access point in the stranded mobile communication devices or between the wireless access point in the wireless base stations in wireless network 130). This helps in terminating and establishing suitable supplemental wireless communication link such as including wireless communication link 127-S.

In accordance with further example embodiments, the data received at the wireless access point 121 is received from the mobile communication device 166 over PC5 interface. This data may be aggregated at transport layer from multiple instances of user equipment. Aggregation is illustrated in FIG. 8.

The ProSe function in FIG. 7 provides the following parameters to the CPEs to enable connectivity among themselves and assign unique IDs: Security parameters, Group IDs multicast addresses, Group ID multicast addresses and radio resource parameters, etc.

Figure 8:
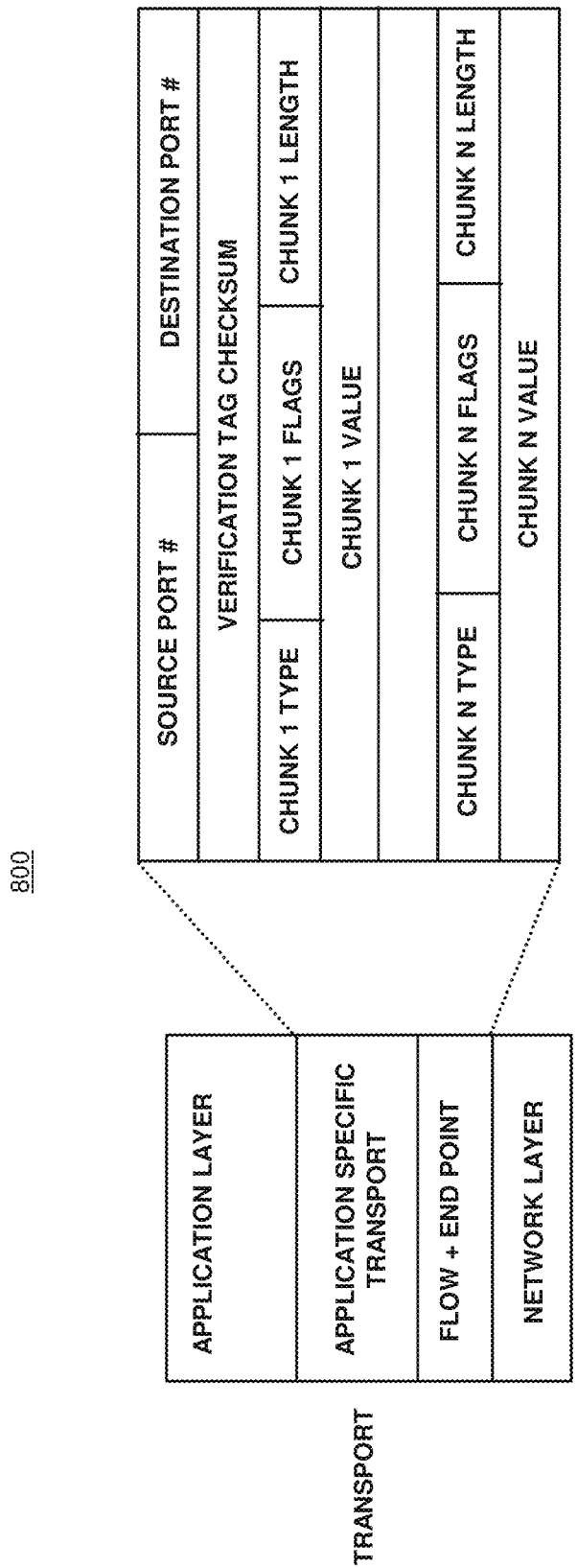
FIG. 8 is an example diagram illustrating implementation of a stream control transmission protocol to support communications according to embodiments herein.

FIG. 8 is an example diagram illustrating implementation of a stream control transmission protocol to support communications according to embodiments herein.

In one embodiment, as shown in protocol and communication layering 800, communications (such as data packets) from the wireless access point 121 (such as customer premises equipment) can be aggregated at a respective Transport layer using SCTP (Stream Control Transmission Protocol).

Since there is data from multiple UEs, in one embodiment, such data is kept separated while its aggregated at the CPE. In one embodiment, this is achieved by creating a pipeline that keeps CPE customer data (such as s data associated with mobile communication devices 161) separate from the rest of the UE data (such as data associated with the mobile communication device 166, mobile communication device 167, etc.) transmitted over wireless communication link 127-1.

In general, in further example embodiments, two separate virtual networks (a first network for the mobile communication devices 161 operated in the subscriber domain 150-1 and a second network for the traffic associated with the mobile communication devices 166, 167, etc.) are maintained to ensure the traffics remain separated and different algorithms and traffic optimization could be applied.

Figure 9:
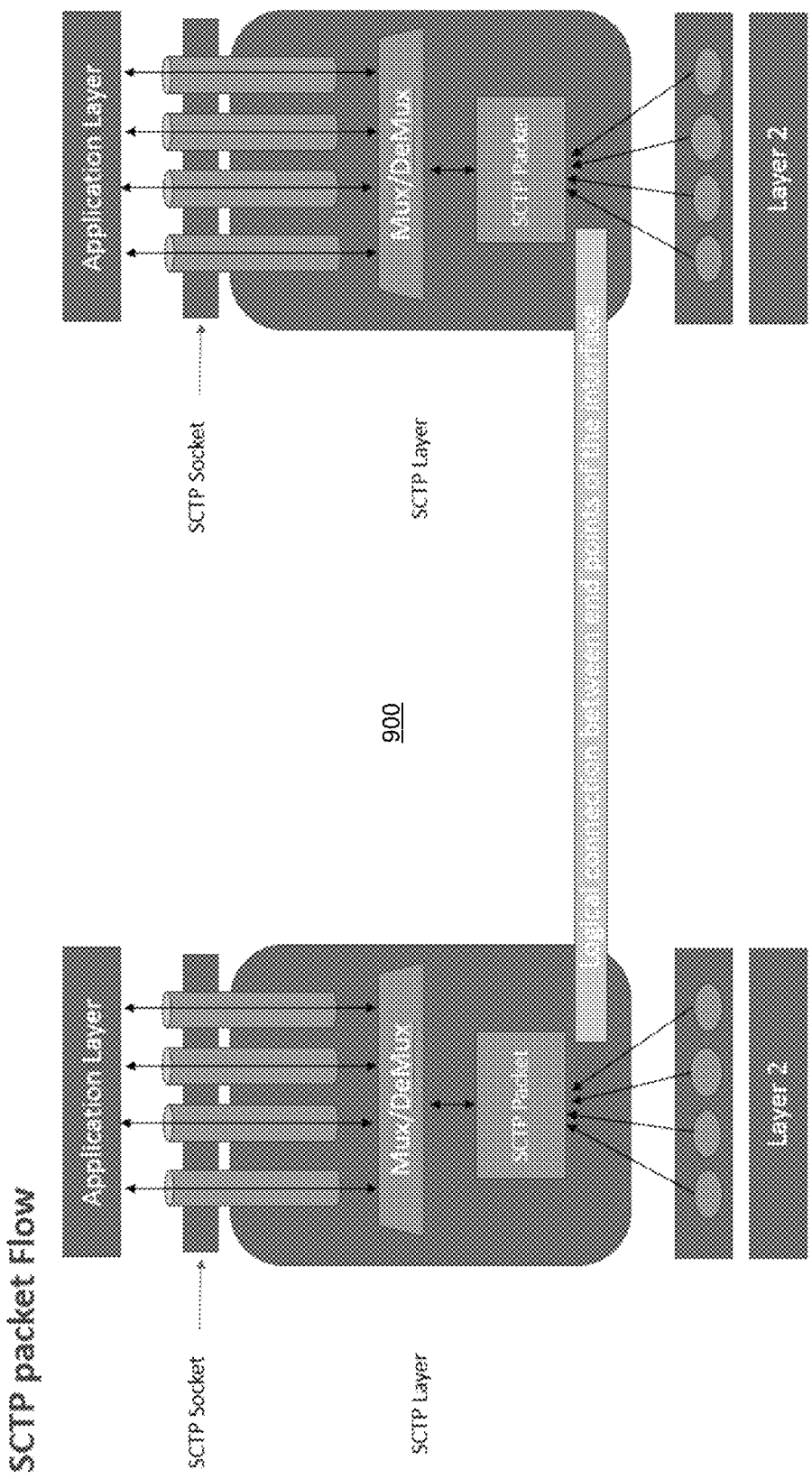
FIG. 9 is an example diagram illustrating packet flow associated with customer premises equipment according to embodiments herein.

FIG. 9 is an example diagram illustrating packet flow associated with customer premises equipment according to embodiments herein.

In this example embodiment, the wireless access point 121 implements the components shown in FIG. 9 to support wireless connectivity between the mobile communication device 166 (and one or more other mobile communication devices) and the wireless base station 130-1.

In such an instance, the wireless access point 121 tracks the different data flows via tagging. For example, the wireless access point 121 can be configured to tag communications from the mobile communication device 166 received over the wireless communication link 127-S with a first tag value (first unique identifier value); the wireless access point 121 can be configured to tag to communications from the mobile communication device 167 received over another wireless communication link with a second tag value (second unique identifier value); and so on. In a similar manner as previously discussed, communications associated with one or more of the mobile communication devices 161 transmitted in the uplink direction from the wireless access point 121 to the wireless base station 130-1 are communicated over the wireless communication link 127-1 over a separate data flow.

Thus, embodiments herein include a need to keep protocol data from each of the different data flows separate from each other such as via multiplexing and demultiplexing at the wireless access point 121.

Figure 10:
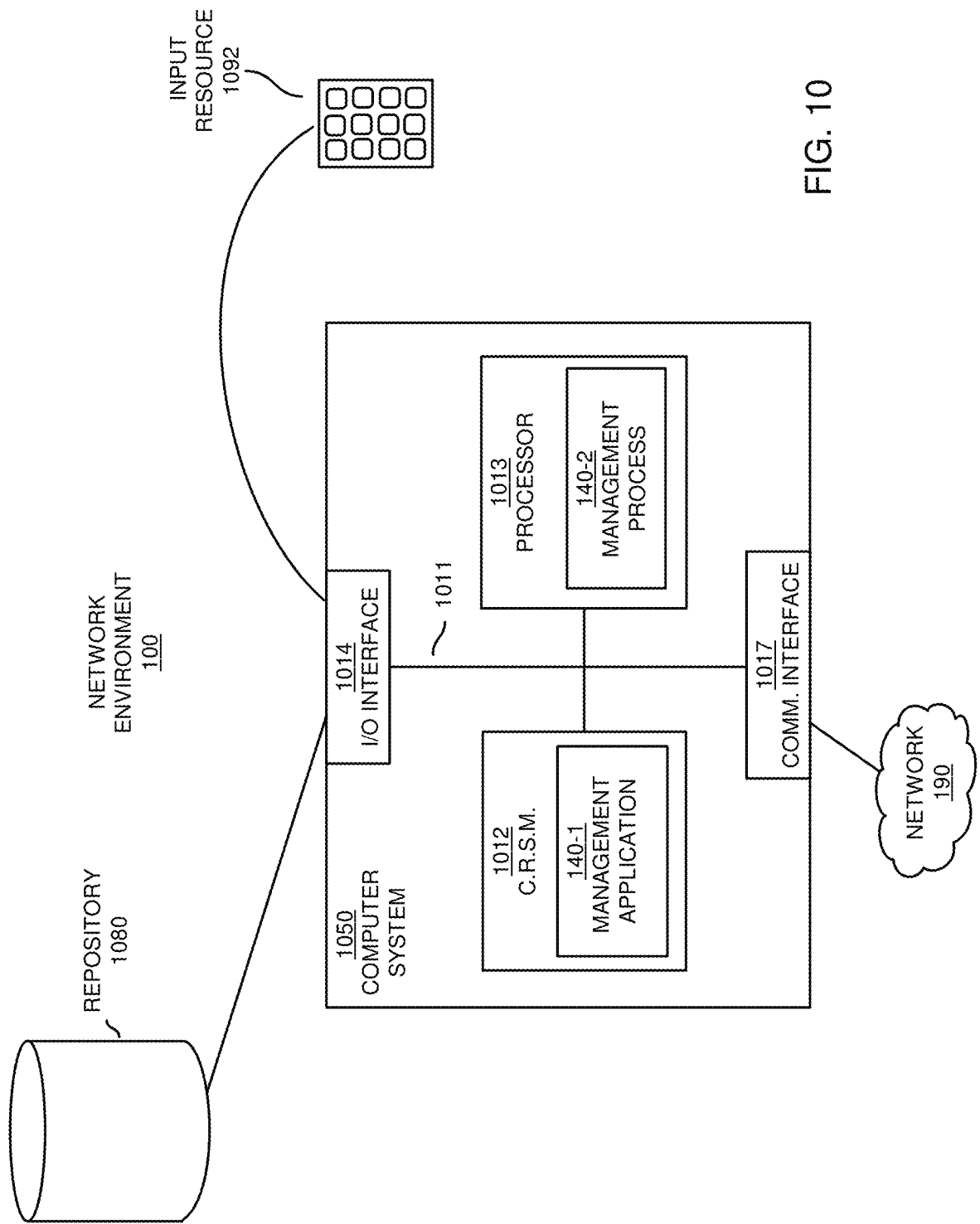
FIG. 10 is an example diagram illustrating example computer hardware and software operable to execute operations according to embodiments herein.

FIG. 10 is an example block diagram of a computer system for implementing any of the operations as previously discussed according to embodiments herein.

Note that any of the resources (such as wireless access point 121, mobile communication device 166, allocation management resource 140, communication management resource 141, mobile communication devices, user equipment, wireless stations, wireless base stations, communication management resource, control management resource, etc.) as discussed herein can be configured to include computer processor hardware and/or corresponding executable instructions to carry out the different operations as discussed herein.

For example, as shown, computer system 1050 of the present example includes interconnect 1011 coupling computer readable storage media 1012 such as a non-transitory type of media (which can be any suitable type of hardware storage medium in which digital information can be stored and or retrieved), a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with management application 140-1 (e.g., including instructions) in a respective wireless station to carry out any of the operations as discussed herein.

During operation of one embodiment, processor 1013 accesses computer readable storage media 1012 via the use of interconnect 1011 in order to launch, run, execute, interpret or otherwise perform the instructions in management application 140-1 stored on computer readable storage medium 1012. Execution of the management application 140-1 produces management process 140-2 to carry out any of the operations and/or processes as discussed herein.

Those skilled in the art will understand that the computer system 1050 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIG. 11. Note that the steps in the flowcharts below can be executed in any suitable order.

Figure 11:
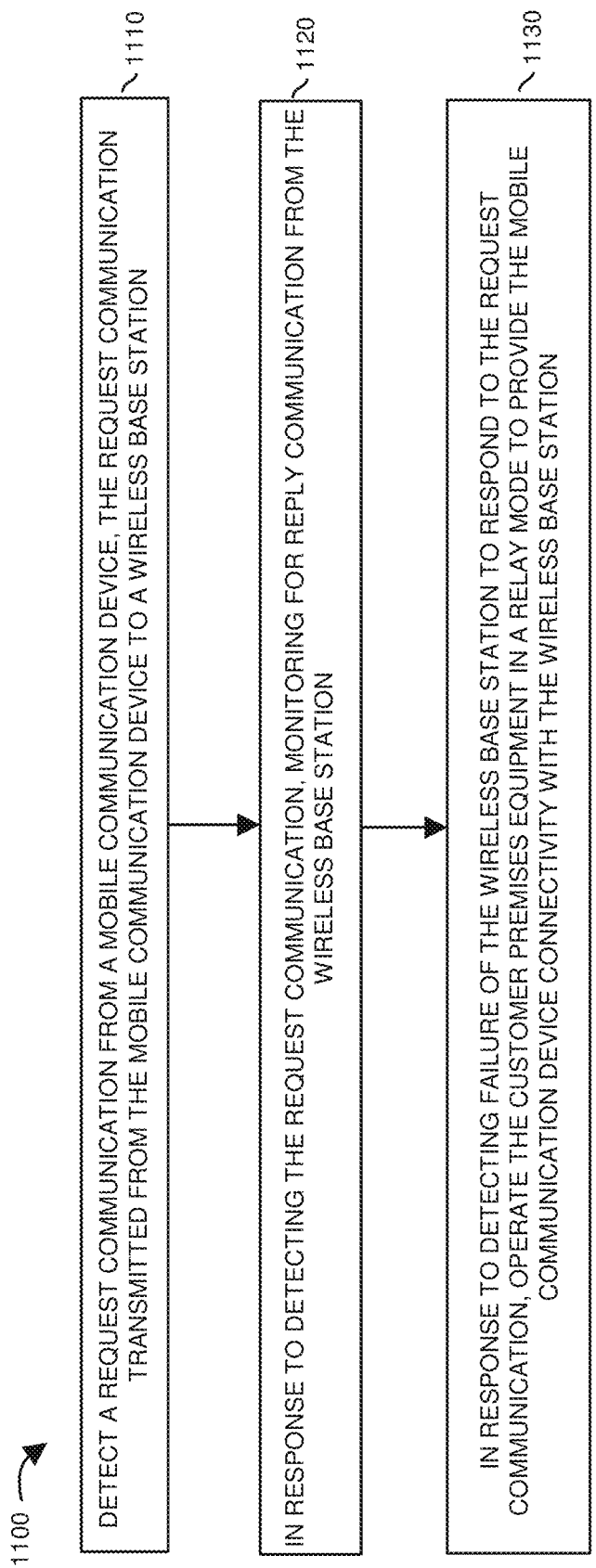
FIG. 11 is an example diagram illustrating a method according to embodiments herein.

FIG. 11 is a flowchart 1100 illustrating an example method according to embodiments herein. Note that there will be some overlap with respect to concepts as discussed above.

In processing operation 1110 or, the wireless station 121 detects a request communication from a mobile communication device 166. The request communication is transmitted from the mobile communication device 166 to the wireless base station 130-1.

In processing operation 1120, in response to detecting the request communication (or communications 225 in general), the wireless station 121 monitors for one or more reply communications from the wireless base station 130-1.

In processing operation 1130, in response to detecting failure of the wireless base station 130-1 to respond to the request communication, the wireless base station 130-1 operates in a relay mode to provide the mobile communication device 166 wireless connectivity with the wireless base station 130-1.

Note again that techniques herein are well suited to facilitate collection of information from one or more wireless station and distribution of the information over a network to a communication management resource. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
  at customer premises equipment in a wireless network:
    detecting a request communication transmitted from a mobile communication device, the request communication transmitted from the mobile communication device to a wireless base station;
    in response to detecting the request communication, monitoring for a reply communication from the wireless base station; and
    in response to detecting failure of the wireless base station to respond to the request communication, operating the customer premises equipment in a relay mode to provide the mobile communication device connectivity with the wireless base station, the relay mode supporting communications between the mobile communication device and the wireless base station through the customer premises equipment.

2. The method as in claim 1 further comprising:
  at the customer premises equipment, receiving a notification from the wireless base station, the notification indicating to monitor a wireless channel providing wireless connectivity between the wireless base station and the mobile communication device.

3. The method as in claim 2, wherein the wireless channel is a first wireless channel, the method further comprising:
  at the customer premises equipment:
    detecting the request communication via monitoring of the first wireless channel; and
    detecting the failure of the wireless base station to respond to the request communication via monitoring of a second wireless channel.

4. The method as in claim 1 further comprising:
  at the customer premises equipment:
    in response to detecting the failure of the wireless base station to respond to the request communication, transmitting a message to the wireless base station indicating the detected request communication transmitted from the mobile communication device.

5. The method as in claim 4 further comprising:
  at the customer premises equipment:
    populating the message to indicate an identity of the mobile communication device transmitting the request communication.

6. The method as in claim 1, wherein operating the customer premises equipment in the relay mode to provide the mobile communication device the connectivity with the wireless base station includes:
  establishing a first wireless communication link between the customer premises equipment and the mobile communication device; and
  establishing a second wireless communication link between the customer premises equipment and the wireless base station.

7. The method as in claim 6 further comprising:
  receiving first communications from the mobile communication device over the first wireless communication link;
  transmitting the first communications from the customer premises equipment over the second wireless communication link to the wireless base station;
  receiving second communications from the wireless base station over the second wireless communication link; and
  transmitting the second communications from the customer premises equipment over the first wireless communication link to the mobile communication device.

8. The method as in claim 6 further comprising:
  supporting first time-division duplex communications over the first wireless communication link; and
  supporting second time-division duplex communications over the second wireless communication link, the second time-division duplex communications synchronized with the first time-division duplex communications.

9. The method as in claim 1 further comprising:
  at the customer premises equipment, scheduling communications between the mobile communication device and the wireless base station to support a dropped wireless connection between the mobile communication device and the wireless base station as indicated by the detected failure.

10. The method as in claim 1, wherein the customer premises equipment is a fixed wireless base station providing user equipment in a subscriber domain access to a remote network over first wireless connectivity between the customer premises equipment and the wireless base station; and
  providing the mobile communication device access to the remote network through the customer premises equipment, the mobile communication device disposed outside the subscriber domain.

11. The method as in claim 1 further comprising:
at the customer premises equipment:
receiving allocation of wireless channels from a spectrum access system, the allocated wireless channels supporting connectivity between the customer premises equipment and the mobile communication device; and
communicating heartbeat messages from the customer premises equipment to the spectrum access system to receive continued granted use of the allocated wireless channels.

12. The method as in claim 1 further comprising:
at the customer premises equipment:
in response to detecting the failure of the wireless base station to respond to the request communication, transmitting a message to the wireless base station indicating an identity of the mobile communication device; and
receiving allocation of a wireless channel to support connectivity between the customer premises equipment and the mobile communication device.

13. The method as in claim 1, wherein detecting the request communication at the customer premises equipment includes:
at the customer premises equipment: detecting the request communication via the customer premises equipment monitoring for presence of the reply communication over a first wireless channel.

14. The method as in claim 1, wherein the request communication is transmitted by the mobile communication device to retrieve content.

15. The method as in claim 1, wherein the request communication is a request by the mobile communication device to establish a respective wireless communication link with the wireless base station.

16. The method as in claim 1, wherein the wireless base station fails to respond to the mobile communication device in response to a condition in which the wireless base station is out of wireless range with respect to the mobile communication device.

17. The method as in claim 16, wherein the customer premises equipment is in wireless communication range of both the mobile communication device and the wireless base station.

18. The method as in claim 1, wherein the customer premises equipment is in wireless communication range of both the mobile communication device and the wireless base station;
wherein the mobile communication device is within wireless range of the wireless base station to receive wireless communications from the wireless base station; and
wherein the wireless base station is out of wireless range to receive wireless communications from the mobile communication device.

19. The method as in claim 1, wherein a wireless power level of the request communication transmitted from the mobile communication device is too low for the wireless base station to receive the request communication.

20. The method as in claim 1, wherein detecting the failure of the wireless base station to respond to the request communication includes:
detecting that the wireless base station does not respond to the request communication within a time duration threshold level.

21. The method as in claim 1, wherein operating the customer premises equipment in the relay mode to provide the mobile communication device the connectivity with the wireless base station includes:
receiving first wireless communications from the mobile communication device over a first wireless communication link between the mobile communication device and the customer premises equipment; and
transmitting the received first wireless communications from the customer premises equipment over a second wireless communication link to the wireless base station.

22. The method as in claim 21, wherein the wireless base station is in wireless communication with the mobile communication device over a third wireless communication link, the third wireless communication link supporting conveyance of downlink wireless communications transmitted from the wireless base station to the mobile communication device.

23. A system comprising:
communication management hardware operative to:
detect a request communication transmitted from a mobile communication device, the request communication transmitted from the mobile communication device to a wireless base station;
in response to detecting the request communication, monitor for a reply communication from the wireless base station; and
in response to detecting failure of the wireless base station to respond to the request communication, operate customer premises equipment in a relay mode to provide the mobile communication device connectivity with the wireless base station, the relay mode supporting communications between the mobile communication device and the wireless base station through the customer premises equipment.

24. The system as in claim 23, wherein the communication management hardware is further operative to:
receive a notification from the wireless base station, the notification indicating to monitor a wireless channel providing wireless connectivity between the wireless base station and the mobile communication device.

25. The system as in claim 24, wherein the wireless channel is a first wireless channel, the communication management hardware further operative to:
detect the request communication via monitoring of the first wireless channel; and
detect the failure of the wireless base station to respond to the request communication via monitoring of a second wireless channel.

26. The system as in claim 23, wherein the communication management hardware is further operative to:
in response to detecting the failure of the wireless base station to respond to the request communication, transmit a message to the wireless base station indicating the detected request communication transmitted from the mobile communication device.

27. The system as in claim 26, wherein the communication management hardware is further operative to:
populate the message to indicate an identity of the mobile communication device transmitting the request communication.

28. The system as in claim 23, wherein the communication management hardware is further operative to:
establish a first wireless communication link between the customer premises equipment and the mobile communication device; and establish a second wireless communication link between the customer premises equipment and the wireless base station.

29. The system as in claim 28, wherein the communication management hardware is further operative to:
receive first communications from the mobile communication device over the first wireless communication link;
transmit the first communications from the customer premises equipment over the second wireless communication link to the wireless base station;
receive second communications from the wireless base station over the second wireless communication link; and
transmit the second communications from the customer premises equipment over the first wireless communication link to the mobile communication device.

30. The system as in claim 28, wherein the communication management hardware is further operative to:
support first time-division duplex communications over the first wireless communication link; and
support second time-division duplex communications over the second wireless communication link, the second time-division duplex communications synchronized with the first time-division duplex communications.

31. The system as in claim 28, wherein the communication management hardware is further operative to:
schedule first communications between the mobile communication device and the wireless base station to support a dropped wireless connection between the mobile communication device and the wireless base station.

32. The system as in claim 23, wherein the communication management hardware is disposed at a fixed wireless base station, the communication management hardware further operative to:
provide user equipment in a subscriber domain access to a remote network over first wireless connectivity between the customer premises equipment and the wireless base station; and
provide the mobile communication device access to the remote network through the customer premises equipment, the mobile communication device disposed outside the subscriber domain.

33. The system as in claim 23, wherein the communication management hardware is further operative to:
receive allocation of wireless channels from a spectrum access system, the allocated wireless channels supporting connectivity between the customer premises equipment and the mobile communication device; and
communicate heartbeat messages from the customer premises equipment to the spectrum access system to receive continued granted use of the allocated wireless channels.

34. The system as in claim 23, wherein the communication management hardware is further operative to:
in response to detecting the failure of the wireless base station to respond to the request communication, transmit a message to the wireless base station indicating an identity of the mobile communication device; and
receive allocation of a wireless channel to support connectivity between the customer premises equipment and the mobile communication device.

35. Computer-readable storage hardware having instructions stored thereon, the instructions, when carried out by computer processor hardware associated with customer premises equipment in a wireless network, cause the computer processor hardware to:
detect a request communication from a mobile communication device, the request communication transmitted from the mobile communication device to a wireless base station;
in response to detecting the request communication, monitor for a reply communication from the wireless base station; and
in response to detecting failure of the wireless base station to respond to the request communication, operate the customer premises equipment in a relay mode to provide the mobile communication device connectivity with the wireless base station, the relay mode supporting communications between the mobile communication device and the wireless base station through the customer premises equipment.

* * * * *